Patented Nov. 3, 1925.

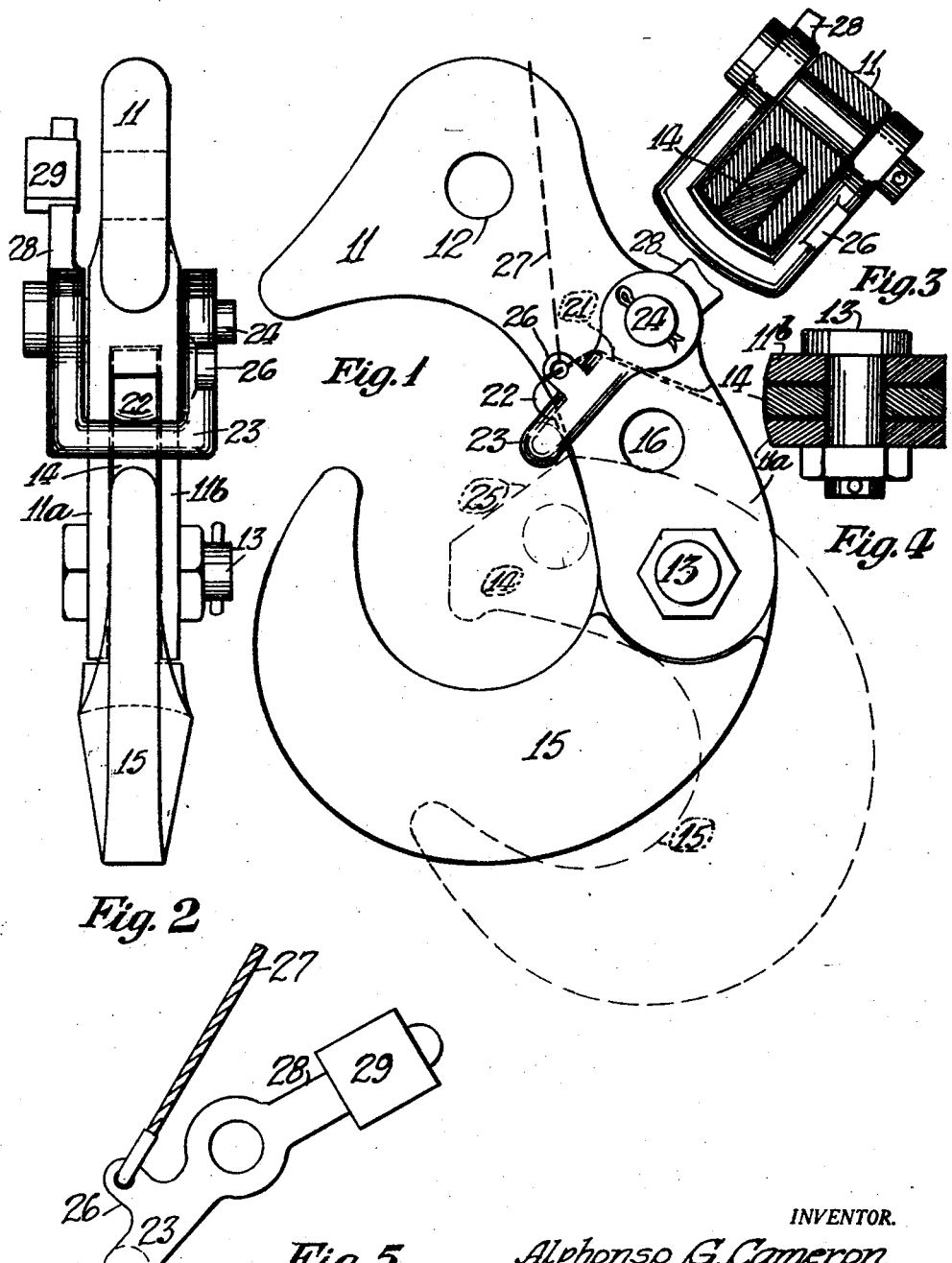

1,559,849

UNITED STATES PATENT OFFICE.

ALPHONSO G. CAMERON, OF NEW YORK, N. Y.

RELEASING HOOK.

Application filed February 11, 1925. Serial No. 8,324.

*To all whom it may concern:*

Be it known that I, ALPHONSO G. CAMERON, a citizen of the United States, and resident of New York, in the county of New York and State of New York, have invented certain new and useful Improved Releasing Hooks, of which the following is a specification.

This invention relates to release hooks and as shown is applied to hooks for lifting heavy loads. The objects of the invention are to provide a hook of this type which is quick releasing and which does not obstruct the use of the hook in its regular operation. Other objects of the invention reside in the details of construction and operation as more fully explained in the following specification and shown in the accompanying drawings in which, Fig. 1, is a side elevation of a hook embodying my invention, Fig. 2 is a front elevation corresponding to Fig. 1, Fig. 3 is a sectional detail in the plane of the latching shackle, Fig. 4 is a sectional detail across the pivot of the hook and Fig. 5 is an outline of the releasing shackle remotely controlled.

In handling heavy bales and similar articles considerable difficulty is experienced in releasing the hook after the bale is placed and it is the object of the present invention to facilitate this operation and save time without, however, impairing the efficiency of the hook or obstructing the free passage of the hook as it grips the bands of the bale. This hook is also designed to be self releasing as the weight of the load is taken off such as is commonly used on life boats, and it may be released through a remote control.

It will be noted from Fig. 1 that the hook has the regular contour of a heavy duty hook having a stem 11 with an eye 12 to which the chain of the hoist is attached. This stem is forked in the rear lower section into the sides 11ª and 11ᵇ between which the end 14 of the hook 15 is placed, these parts being pivotally connected by the bolt 13. A hole 16 is provided through the sides 11ª and 11ᵇ and 14 through which a bolt may be passed to lock the stem and hook rigidly together thereby making a solid non-releasing hook out of the mechanism.

In normal operation the stem and the hook are locked together by the shackle 23 which is pivoted to the stem at 24. The upper end 14 of the hook is shaped as indicated by the dotted line 21 and terminates in a rounded projection 22 which latches with the shackle 23 as shown and when so latched the hook and the stem are rigidly locked together for carrying a load. It will be noted however that when the shackle 23 is raised above the projection 22 the hook is free to turn on pivot 13 and may assume the position indicated by the dotted outline or a position in which it will release its load. The shackle 23 thus carries a substantial part of the load, it is therefore substantially constructed in U shape and pivoted to the stem by the through bolt 24.

The upper end of 14 is sloped as indicated at 25 so that the shackle 23 rides upon this sloped surface as the hook is restored to its normal position when the shackle drops into the position shown and automatically latches the parts together. When the hook is latched for lifting purposes it will be noted that there are no obstructions at the entrance of the hook and there are no obstructions within the contour of the hook except the cross-bar of the shackle 23 which is against the back of the hook and out of the way.

The shackle 23 may be moved to the releasing position by a remote control through cable 27 attached to the eye 26 of the shackle. By pulling on this cable, shackle 23 is raised to the releasing position when the hook discharges its load.

In certain cases such as in launching life boats it is desirable that the hook release as soon as the suspended weight is released. My invention is readily adapted for this purpose by using a counterweight which will raise the shackle to the releasing position as soon as the load is released. For this purpose I provide an arm 28 with an adjustable counterweight 29 which applies a bias to move 23 to the releasing position. While the load is on the hook, shackle 23 is held in the latching position by projection 22 but when the load is released shackle 23 is moved by the counterweight to the unlatched position automatically thereby releasing the load from the hook.

Having thus described my invention, I claim:

1. A releasing hook as described comprising a stem for attaching to a hoist and having a forked lower end, a hook member pivoted in said fork and having an extended end in said fork aligning with said fork in the operative position, a projection on said member extending beyond the plane of said fork and a U shaped latch pivoted to said stem and arranged to engage said extended end below said projection whereby said stem and hook are rigidly locked together.

2. A releasing hook comprising a stem, a hook member pivotally connected with said stem and having an end with an inclined plane aligning with said stem when the hook is in the operative position, a shackle pivoted to said stem and arranged to ride upon said inclined plane when the hook is in the released position and to automatically latch said hook and stem when in the operative position.

Signed at New York, in the county of New York, and State of New York, this 30th day of January, A. D. 1925.

ALPHONSO G. CAMERON.